3,135,788
PREPARATION OF DL-CARNITINE HYDROCHLORIDE FROM TRIMETHYLAMINE HYDROCHLORIDE AND EPIHALOGENOHYDRIN

Junzo Noguchi, Kanazawa, and Naoichi Sakota, Nishinomiya, Japan, assignors to Nihon Zoki Seiyaku Kabushikikaisha, Osaka, Japan, a corporation of Japan
No Drawing. Filed July 18, 1960, Ser. No. 43,275
Claims priority, application Japan Sept. 28, 1959
10 Claims. (Cl. 260—531)

This invention relates to a method for the preparation of DL-carnitine hydrochloride, and in particular, to a novel synthetic method for preparing DL-carnitine hydrochloride of high purity in a good yield.

The chemical nomenclature of said DL-carnitine hydrochloride is DL-γ-trimethyl ammonium-β-hydroxybutyrate hydrochloride represented by the following constitutional formula.

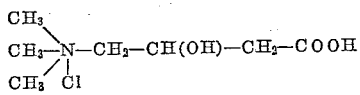

In the following description of the specification, for brevity's sake, the conventional designation of simple "carnitine" will be used instead of the rather lengthy DL-carnitine hydrochloride.

Carnitine is a substance that was found in the muscle extract of mammal by Gulevisch and Krimberg (Z. Physiol. Chem. 45, 326), and by Kutscher (Z. Untersuch. Nahr. u. Genussm., 10, 528) in 1905. The constitutional formula of carnitine was determined by Tomita and others in 1927. In 1952, carnitine was proved by Carter et al. to be the same substance as vitamine $B_T$, a new member of vitamine B group, which has been discovered by Fraenkel et al. in 1948.

Numerous studies have been made on the physiological and pharmacological actions of vitamine $B_T$, i.e. carnitine.

The preparing methods of carnitine may be divided into two classes, i.e. an extracting process from natural materials and a chemical synthesis. A number of methods have been proposed up to the present. The extracting process from natural materials, however, does not go beyond the laboratory scale. On the other hand, the synthetic method which is now considered to be successful to a certain extent comprises, however, many difficulties, such as, an extremely low yield and a large amount of by-products, which make it practically impossible to obtain a product of high purity. The method by Friedman [Biochem. Preparations, 6 (1958)] is an example of the extracting processes from natural sources. According to this method, carnitine is isolated from beef extract by treating with organic solvents, ion-exchange resins and other agents, but the yield of carnitine is only about 7 g. based on 450 g. of beef extract. The method devised by Carter and Bhattacharyya [J. Amer. Chem. Soc., 75, 2503 (1953)] is an example of the synthetic methods. According to this method, carnitine is to be synthesized from benzaldehyde and epichlorohydrin, through several steps. The final yield of carnitine is but ca. 20–25%. The method by Dechamps and others [Compt. rend., 283, 826, (1954)] is another example of a synthetic method, in which γ-chloro-β-oxybutyronitrile that has been preliminarily synthesized is made to react with trimethylamine, and the reaction product hydrolzed under pressure to produce dicarnitine, but the yield is only ca. 20%.

We, the inventors of this invention, have searched for a better synthetic method of producing carnitine, and have inquired into the origin for the instability of carnitine. This led to a discovery of the fact that the instability is not an inherent nature of carnitine itself, but is derived from the impurities still held in carnitine, and that carnitine is, if pure, a very stable substance. Further we found out that by any conventional method for synthesizing carnitine, a large amount of by-products are unavoidably formed, and that the instability of carnitine would be ascribable to the presence of such by-products which are practically impossible to remove from carnitine even by recrystallization. As a logical consequence, it ensues that a synthetic method for preparing carnitine must satisfy the following three conditions; namely, (1) Carnitine should be produced in a high yield,
(2) The amount of by-products accompanying through all the steps should be minimum,
(3) Said by-products should be readily removable from the final product, carnitine.

We have accomplished, as a result of numerous experiments, the method of this invention which satisfies the above three requirements.

The method of this invention comprises a reaction of epihalogenohydrin having the general formula of

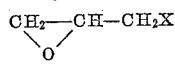

(where X denotes Cl, Br or I atom) upon trimethylamine hydrochloride to produce 3-halogeno-2-oxypropyl trimethyl ammonium chloride which is represented by the general formula

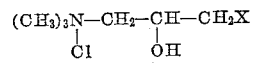

(where X denotes Cl, Br or I atom), then a reaction of this 3-halogeno-2-oxypropyl trimethyl ammonium chloride upon NaCN or KCN to produce 3-cyano-2-oxypropyl trimethyl ammonium chloride, and then, a hydrolysis of said 3-cyano-2-oxypropyl trimethyl ammonium chloride with under normal pressure to produce carnitine which is represented by the formula

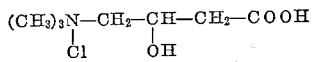

Carnitine produced by the above method may, if desired, be refined by treating with glacial acetic acid to remove the reaction by-products as will be later described. The reaction scheme of the method of this invention is as follows.

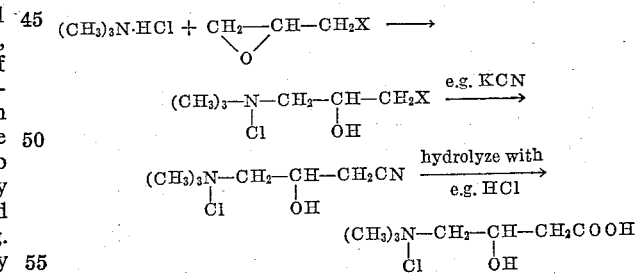

According to the method of this invention, carnitine can be obtained with yield of ca. 85% in the preparation of a crude product, and ca. 75% in case of the refined product. Carnitine of high purity may also be obtained, because, as is evident from the reaction mechanism, the by-products are minute in amount and their removal is quite easy.

As is apparent from the above explanation, the object of this invention is to provide a method for preparing stable carnitine of high purity in a good yield.

A still another object of this invention is to provide a novel method for synthesizing carnitine which is characterized by the minuteness in amount of the by-products formed during the process of preparing carnitine, and by the easiness with which these by-products can be removed from the final product, carnitine.

A still further object of this invention is to provide an effective method for removing by-products from the carnitine produced.

The detailed description of the method of this invention will be given hereinafter in the order of producing steps.

(1) Epichlorohydrin, epibromohydrin or epiiodohydrin is preferred as epihalogenohydrin to be used in the method of this invention. The reaction of epihalogenohydrin with trimethylamine hydrochloride may be accomplished by either directly mixing the two, or by carrying out the reaction in the presence of an organic solvent such as methanol or ethanol or in an aqueous solution. The reaction may be effected at 30–50° C. under normal pressure, or at a higher temperature under pressure. 3-halogeno-2-oxypropyl trimethyl ammonium chloride represented by the general formula

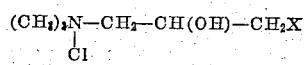

(where X denotes Cl, Br or I atom) which will be obtained by the above reaction is a novel and unknown substance which is not referred to in literature. The yield is 90–95%.

(2) KCN or NaCN is recommendable as the cyano compound to be brought into reaction with said 3-halogeno-2-oxypropyl trimethyl ammonium chloride. The reaction of 3-halogeno-2-oxypropyl trimethyl ammonium chloride with the cyano compound may be effected by adding the cyano compound dissolved in a possibly small quantity of water to an aqueous solution of 3-halogeno-2-oxypropyl trimethyl ammonium chloride, or, the reaction may as well be carried out in an organic solvent such as methanol or ethanol, or in a mixed solvent made of the said organic solvent and water. This reaction of 3-halogeno-2-oxypropyl trimethyl ammonium chloride with the cyano compound may be effected at 30–60° C., or at a higher temperature under refluxing. The reaction liquid which is weakly alkaline at the end of the reaction is neutralized toward weakly acidic, for example, pH 5 with the addition of an acid, for instance, hydrochloric acid in a draught. Then distilling off the solvent under reduced pressure, 3-cyano-2-oxypropyl trimethyl ammonium chloride which is represented by the formula

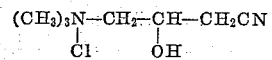

is obtained. The by-product thereby formed will be, if, for example, NaCN is used as the cyano compound, sodium chloride. The reaction product may be subjected to the subsequent hydrolysis either after removal of by-products by recrystallization with methanol, or without such removal. The yield of 3-cyano-2-oxypropyl trimethyl ammonium chloride attained by the above process is ca. 90–95%.

(3) On hydrolyzing 3-cyano-2-oxypropyl trimethyl ammonium chloride thus obtained, the cyano radical is converted into a carboxyl radical, whereby carnitine is produced. An acid, such as hydrochloric acid, is preferably used as the hydrolyzing agent. It is usual to use an acid as the hydrolyzing agent and to do work at high temperature under pressure when a nitrile is to be hydrolyzed into a carboxylic acid, but if such usual practice is applied to the hydrolysis of 3-cyano-2-oxypropyl trimethyl ammonium chloride, a dehydration reaction would occur, and a large amount of crotonobetaine is liable to be by-produced. The removal of crotonobetaine being very difficult, the obtaining of carnitine of high purity should be deemed almost hopeless with the above method of hydrolysis. Even in this case however, the yield of carnitine is considerably higher than that attained by any other conventional method.

As a result of a great number of further experiments on this point, we discovered that the use of a concentrated acid, for example, concentrated hydrochloric acid, as the hydrolyzing agent at approx. 100° C. under normal pressure eases the hydrolysis, producing but an extremely minute amount of by-products including crotonobetaine. We also discovered that the purpose could be attained as well by using an acid of ca. 6N and by heat-treating at approx. 130° C. for several hours provided the hydrolysis be carried out under normal pressure. Therefore, to obtain a carnitine of high purity, a hydrolysis at about 100° C. under normal pressure with a concentrated acid or a hydrolysis at about 130° C. under normal pressure with an acid of ca. 6 N is necessary. The main by-products in this third step are ammonium chloride (when hydrochloric acid is used as the hydrolyzing agent) and crotonobetaine. The hydrolysate may be recrystallized with methanol or ethanol to separate the by-products from carnitine, but we discovered that by treating the hydrolysate with glacial acetic acid in the manner as described below, not only ammonium chloride but also crotonobetaine could be completely removed. The detail of this step follows.

The hydrolysate obtained by hydrolyzing with hydrochloric acid as described above may be either concentrated in vacuo to drive out the greater part of free hydrochloric acid, or neutralized by alkali, e.g., sodium hydroxide of ca. 6 N, and then the hydrolysis product thus treated is, after decolorizing with active charcoal, concentrated to dryness under reduced pressure. The dried product is now treated with hot glacial acetic acid. Filtering off insoluble ammonium chloride and crotonobetaine, and cooling the mother liquor, crystals of carnitine will separate out. By separating the crystals, washing with ethanol, drying under reduced pressure, and then recrystallizing with methanol, carnitine of approx. 100% purity may be obtained. The overall yield of carnitine reaches ca. 85% in the preparation of a crude product, and ca. 75% in case of a refined product.

As above explained, the method of this invention has, over the conventional processes, the advantage which affords obtaining carnitine of high purity with good yield, with fewer working steps, simpler operations, the by-products being minute in amount as is evident from the reaction mechanism. Moreover, the by-products thereby produced can be easily removed. Carnitine prepared by the method of this invention has a purity of approx. 100% and a stability extremely higher than that attainable by any conventional method.

An example embodying the method of this invention will be given. The following example, however, is solely for the purpose of illustration, and should not be construed as a limitation of the scope of the present invention.

*Example*

9.3 g. of epichlorohydrin was added at a temperature of 40–50° C. under stirring to 9.6 g. of trimethylamine hydrochloride dissolved in 10 cc. of water. Continuing the reaction for an hour at said temperature, the reaction product was concentrated under reduced pressure to obtain the crystals of 3-chloro-2-oxypropyl trimethyl ammonium chloride which were recrystallized with 25 cc. of ethanol. The crystals obtained by concentrating the mother liquor were also recrystallized. The yield was 17.4 g. (M.P. 190° C., yield 91.5%). This substance occurs as white, somewhat hygroscopic crystals and is readily soluble in water or alcohol, but insoluble in benzene, toluene, ether, acetone or chloroform.

The result of analysis assuming $(C_6H_{15}C_{10}N)+Cl^-$— Calculated value: N, 7.45%; total Cl, 37.7%; Cl$^-$, 18.88%. Observed value: N, 7.36%; total Cl, 37.54% Cl$^-$; 18.98.

18.8 g. of 3-chloro-2-oxypropyl trimethyl ammonium chloride was dissolved in a mixed solvent composed of 19 cc. of methanol and 1 cc. of water. 5.1 g. of sodium cyanide dissolved in 8 cc. of water was dropped into the solution at 50° C. under stirring. After dropping, the mixture was held at said temperature for 30 min. under stirring. The reaction product was then neutralized with 6 N hydrochloric acid toward pH 5, and, after cooling, sodium chloride separated out and was filtered. The filtrate was concentrated to dryness under reduced pressure, and the residue was washed with small quantity of ethanol. Drying the residue, dissolving in hot methanol, filtering off insoluble matters, and cooling mother liquor, the crystals of 3-cyano-2-oxypropyl trimethyl ammonium chloride which deposited out were filtered and dried. Yield 16.7 g. (M.P. (decomp.) 220–223° C., yield 93.4%).

12.5 cc. of conc. hydrochloric acid was added to 17.9 g. of 3-cyano-2-oxypropyl trimethyl ammonium chloride. Gradually heating the mixture on a water bath under stirring, so bringing the temperature up to 98° C. at the end of about 3 hours, 9 cc. of water was added. After cooled, free hydrochloric acid was neutralized with 3 cc. of 6 N sodium hydroxide, and then by adding 1 g. of active charcoal, the reaction product was decolorized and filtered. The filtrate was concentrated to almost dryness under reduced pressure. Then, this concentrate was, after washing with 10 cc. of ethanol, dried. Yield 24.7 g.

The dried product was dissolved in 46.5 cc. of glacial acetic acid by heating on a boiling water bath. The insoluble matter is removed by filtering hot, and on cooling the mother liquor, crystals of carnitine hydrochloride separated out. The crystals were filtered, washed with 10 cc. of ethanol, and dried. Recrystallizing 19.7 g. of the crude carnitine with methanol, 17 g. of the refined carnitine was obtained [M.P. 195–198° C. (decomposing point), yield 86%]. The overall yield of the refined carnitine through whole steps was ca. 74%. Carnitine thus prepared was an odourless, white, crystalline powder, having a strong acid taste.

Carnitine is readily soluble in water sparingly soluble in cold alcohol but soluble when hot, slightly soluble in absolute alcohol, nearly insoluble in ether, benzene, or acetone.

We claim:

1. A method for the preparation of DL-carnitine hydrochloride consisting:
   (a) in reacting epihalogenohydrin represented by the formula

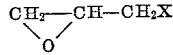

where X is the substance selected from the group consisting of chlorine, bromine and iodine with trimethylamine hydrochloride to produce 3-halogen-2-oxypropyl trimethyl ammonium chloride represented by the formula

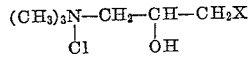

where X is the substance selected from the group consisting of chlorine, bromine and iodine,
   (b) reacting said 3-halogen-2-oxypropyl trimethyl ammonium chloride with a cyanide selected from the group consisting of sodium cyanide and potassium cyanide to produce 3-cyano-2-oxypropyl trimethyl ammonium chloride and
   (c) hydrolyzing said 3-cyano-2-oxypropyl trimethyl ammonium chloride with hydrochloric acid under normal pressure to produce DL-carnitine hydrochloride represented by the formula

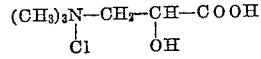

2. A method for the preparation of DL-carnitine hydrochloride as claimed in claim 1, in which 3-halogeno-2-oxypropyl trimethyl ammonium chloride is produced by reacting epihalogenohydrin with trimethylamine hydrochloride in an organic solvent selected from the group consisting of methyl alcohol and ethyl alcohol.

3. A method for the preparation of DL-carnitine hydrochloride as claimed in claim 1, in which 3-halogeno-2-oxypropyl trimethyl ammonium chloride is produced by reacting epihalogenohydrin with trimethylamine hydrochloride in an aqueous solution.

4. A method for the preparation of DL-carnitine hydrochloride as claimed in claim 1, in which 3-cyano-2-oxypropyl trimethyl ammonium chloride is produced by carrying out the reaction of 3-halogeno-2-oxypropyl trimethyl ammonium chloride with a cyanide selected from the group consisting of sodium cyanide and potassium cyanide in an aqueous solution.

5. A method for the preparation of DL-carnitine hydrochloride as claimed in claim 1, in which 3-cyano-2-oxypropyl trimethyl ammonium chloride is produced by carrying out the reaction of 3-halogeno-2-oxypropyl trimethyl ammonium chloride with a cyanaide selected from the group consisting of sodium cyanide and potassium cyanide in an organic solvent selected from the group consisting of methyl alcohol and ethyl alcohol.

6. A method for the preparation of DL-carnitine hydrochloride as claimed in clim 1, in which 3-cyano-2-oxypropyl trimethyl ammonium chloride is produced by carrying out the reaction of 3-halogeno-3-oxypropyl trimethyl ammonium chloride with a cyanide selected from the group consisting of sodium cyanide and potassium cyanide in a mixed solvent made of water and an organic solvent selected from the group consisting of methyl alcohol and ethyl alcohol.

7. A method for the preparation of DL-carnitine hydrochloride as claimed in claim 1, in which concentrated hydrochloric acid is used as the hydrolyzing agent, and the operation is worked at approximately 100° C. under normal pressure to hydrolyze 3-cyano-2-oxypropyl trimethyl ammonium chloride.

8. A method for the preparation of DL-carnitine hydrochloride as claimed in claim 1, in which hydrochloric acid of ca. 6 N is used as the hydrolyzing agent, and the operation is worked at approximately 130° C. under normal pressure to hydrolyze 3-cyano-2-oxypropyl trimethyl ammonium chloride.

9. A method for the preparation of DL-carnitine hydrochloride as claimed in claim 1, in which crude DL-carnitine hydrochloride is dissolved in hot glacial acetic acid, insoluble matters are hot filtered, the filtrate is allowed to be cooled, and the crystals of DL-carnitine hydrochloride are separated.

10. A method for the preparation of DL-carnitine hydrochloride as claimed in claim 1 consisting in reacting epichlorohydrin with trimethylamine hydrochloride to produce 3-chloro-2-oxypropyl trimethyl ammonium chloride, reacting the latter with sodium cyanide to produce 3-cyano-2-oxypropyl trimethyl ammonium chloride, hydrolyzing this with concentrated hydrochloric acid at about 100° C. under normal pressure to produce crude DL-carnitine hydrochloride, dissolving this crude DL-carnitine hydrochloride in hot glacial acetic acid, and crystallizing DL-carnitine hydrochloride from the filtrate.

References Cited in the file of this patent

Harris et al.: Vitamins and Hormones, vol. XV, page 81 (1957).